United States Patent
Ho et al.

(10) Patent No.: US 12,075,355 B2
(45) Date of Patent: *Aug. 27, 2024

(54) LOW-LATENCY ENHANCEMENTS FOR A WIRELESS NETWORK

(71) Applicant: QUALCOMM Incorporated, San Diego, CA (US)

(72) Inventors: Sai Yiu Duncan Ho, San Diego, CA (US); George Cherian, San Diego, CA (US); Abhishek Pramod Patil, San Diego, CA (US); Yanjun Sun, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,702

(22) Filed: Jun. 26, 2023

(65) Prior Publication Data

US 2023/0345365 A1    Oct. 26, 2023

Related U.S. Application Data

(63) Continuation of application No. 17/446,085, filed on Aug. 26, 2021, now Pat. No. 11,737,021.

(Continued)

(51) Int. Cl.
*H04W 52/02* (2009.01)
*H04W 28/02* (2009.01)
*H04W 74/0816* (2024.01)

(52) U.S. Cl.
CPC ............ *H04W 52/0216* (2013.01); *H04W 28/0236* (2013.01); *H04W 28/0268* (2013.01); *H04W 52/0229* (2013.01); *H04W 74/0816* (2013.01)

(58) Field of Classification Search
CPC ......... H04W 52/0216; H04W 28/0236; H04W 28/0268; H04W 52/0229; H04W 74/0816;
(Continued)

(56) References Cited

U.S. PATENT DOCUMENTS 11,737,021 B2 *   8/2023   Ho ................. H04W 74/0816
                                                       370/318
2016/0219512 A1   7/2016   Asterjadhi et al.
(Continued)

OTHER PUBLICATIONS

Deng D-J., et al., "IEEE 802.11ax: Highly Efficient WLANs for Intelligent Information Infrastructure", IEEE Communications Magazine, IEEE Service Center, Piscataway, US, vol. 55, No. 12, Dec. 1, 2017, pp. 52-59, XP011674426, ISSN: 0163-6804, DOI: 10.1109/MCOM.2017.1700285 [retrieved on Dec. 13, 2017] p. 55, figure 2.
(Continued)

*Primary Examiner* — Omer S Mian
(74) *Attorney, Agent, or Firm* — Holland & Hart LLP

(57) ABSTRACT

This disclosure provides systems, methods, and apparatuses for wireless communication that can be used to establish a restricted target wake time (TWT) session on a wireless medium. In some implementations, an access point (AP) establishes a restricted TWT session for one or more wireless stations (STAs) associated with latency sensitive traffic, the restricted TWT session including restricted TWT service periods (SPs) during which the AP reserves access to the wireless medium for only the one or more STAs associated with the latency sensitive traffic. The AP transmits a clear-to-send (CTS) frame at a start of each restricted TWT SP, the CTS frame indicating to other STAs that the wireless medium is unavailable for a duration of the respective restricted TWT SP. The AP transmits latency sensitive data to or receives latency sensitive data from the one or more STAs during at least one of the restricted TWT SPs.

30 Claims, 13 Drawing Sheets

Related U.S. Application Data

(60) Provisional application No. 63/072,084, filed on Aug. 28, 2020.

(58) Field of Classification Search
CPC ......... H04W 72/1242; H04W 52/0219; H04W 84/12; H04W 74/006; Y02D 30/70
See application file for complete search history.

(56) References Cited

U.S. PATENT DOCUMENTS

| | | | |
|---|---|---|---|
| 2017/0311258 A1* | 10/2017 | Asterjadhi | H04W 28/022 |
| 2019/0289625 A1* | 9/2019 | Kwon | H04W 72/23 |
| 2020/0015269 A1* | 1/2020 | Kwon | H04L 1/00 |
| 2021/0315009 A1* | 10/2021 | Xia | H04W 8/04 |
| 2021/0360646 A1* | 11/2021 | Chu | H04W 72/569 |
| 2022/0070772 A1 | 3/2022 | Ho | |
| 2022/0217078 A1* | 7/2022 | Ford | H04L 49/3018 |

OTHER PUBLICATIONS

Hong (Yonsei Univ) H., et al., "MU-RTS/CTS for TWT Protection, 11-16-0353-02-00ax-mu-rts-cts-for-twt-protection", IEEE Draft, IEEE 802.11-16/0353r2, 11-16-0353-02-00AX-MU-RTS-CTS-FOR-TWT-PROTECTION, IEEE-SA Mentor, Piscataway, NJ, USA, vol. 802.11ax, No. 2, Mar. 16, 2016 (Mar. 16, 2016), pp. 1-13, XP068105232, p. 2, p. 4-p. 8, p. 11.

Hu (Facebook Inc) C., et al., "Prioritized EDCA Channel Access", IEEE Draft, IEEE 802.11-20/1045r3, 11-20-1045-03-00BE-PRIORITIZED-EDCA-CHANNEL-ACCESS, IEEE-SA Mentor, Piscataway, NJ, USA, vol. 802.11 EHT, 802.11be, No. 3, Aug. 26, 2020 (Aug. 26, 2020), pp. 1-43, XP068172273, Jul. 29, 2020, p. 2, p. 30.

Hu (Facebook Inc) C., et al., "Prioritized EDCA Channel Access Over Latency Sensitive Links in MLO", IEEE Draft, IEEE 802.11-20/408r6, 11-20-0408-06-00BE-PRIORITIZED-EDCA-CHANNEL-ACCESS-OVER-LATENCY-SENSITIVE-LINKS-IN-MLO, IEEE-SA Mentor, Piscataway, NJ, USA, vol. 802.11 EHT, 802.11be, No. 6, Jun. 22, 2020 (Jun. 22, 2020), pp. 1-29, XP068169649, Mar. 9, 2020, p. 2, p. 28-p. 29.

International Preliminary Report on Patentability—PCT/US2021/047882—The International Bureau of WIPO—Geneva, Switzerland—Mar. 9, 2023.

International Search Report and Written Opinion—PCT/US2021/047882—ISA/EPO—Dec. 22, 2021.

* cited by examiner

700

702

Indicating that each of the other STAs is to terminate a transmit opportunity (TXOP) on the wireless medium at or before the start of each restricted TWT SP of the one or more restricted TWT SPs.

Indicating that each of the other STAs is not permitted to access the wireless medium during each restricted TWT SP of the one or more restricted TWT SPs.

Permitting one or more of the other STAs to access the wireless medium during time periods outside the one or more restricted TWT SPs of the restricted TWT session.

*Figure 7C*

LOW-LATENCY ENHANCEMENTS FOR A WIRELESS NETWORK

CROSS-REFERENCE TO RELATED APPLICATIONS

This Patent Application is a continuation of U.S. patent application Ser. No. 17/446,085 entitled "LOW-LATENCY ENHANCEMENTS FOR A WIRELESS NETWORK," filed on Aug. 26, 2021, which claims priority to U.S. Provisional Patent Application No. 63/072,084 entitled "LOW LATENCY ENHANCEMENTS FOR A WIRELESS NETWORK" and filed on Aug. 28, 2020; each of which is assigned to the assignee hereof. The disclosures of all prior Applications are considered part of and are incorporated by reference in this Patent Application.

TECHNICAL FIELD

This disclosure relates generally to wireless communications, and more specifically, to ensuring certain data throughput levels are maintained for latency sensitive traffic.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some traffic, such as gaming traffic, has strict end-to-end latency and packet loss requirements, and may be classified as low-latency or latency sensitive traffic. It is desirable for WLANs to recognize latency sensitive traffic, and to ensure that latency sensitive traffic can be handled without violating any associated latency, packet loss, or data throughput requirements.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communications. In some implementations, the method may be performed by a wireless communication device operating as an access point (AP), and may include establishing a restricted target wake time (TWT) session on a wireless medium for one or more wireless stations (STAs) associated with latency sensitive traffic. The restricted TWT session may include one or more restricted TWT service periods (SPs) for communications on the wireless medium with only the one or more STAs associated with the latency sensitive traffic. The method may include transmitting a clear-to-send (CTS) frame on the wireless medium at a start of each restricted TWT SP of the one or more restricted TWT SPs. The CTS frame may indicate to other STAs that the wireless medium is busy or unavailable for a duration of the respective restricted TWT SP. The method may include transmitting latency sensitive data to or receiving latency sensitive data from the one or more STAs during at least one restricted TWT SP of the one or more restricted TWT SPs. In some implementations, a receiver address (RA) of the CTS frame may be set to a configured medium access control (MAC) address indicating that STAs belonging to the restricted TWT session are permitted to access the wireless medium during the respective restricted TWT SP. In some instances, the configured MAC address may correspond to a configured network allocation vector (NAV) setting for the other STAs.

In some implementations, the method may also include indicating that each of the other STAs is to terminate a transmit opportunity (TXOP) on the wireless medium at or before the start of each restricted TWT SP of the one or more restricted TWT SPs. In some other implementations, the method may also include indicating that each of the other STAs is not permitted to access the wireless medium during each restricted TWT SP of the one or more restricted TWT SPs. In some instances, the indications may be included in a TWT Parameter Information field of a TWT element carried in one or more beacon frames transmitted from the AP.

In some implementations, the method may also include detecting an absence of data transmissions from the one or more STAs for more than a time period during a respective restricted TWT SP, and releasing control of the wireless medium during a remaining portion of the respective restricted TWT SP based on detecting the absence of data transmissions from the one or more STAs. In some instances, releasing control of the wireless medium may include transmitting a contention-free end (CF-END) frame on the wireless medium.

In some implementations, establishing the restricted TWT session may include transmitting a frame indicating a latency sensitive traffic priority associated with the restricted TWT session, and receiving, from each of the one or more STAs, a request to become members of the restricted TWT session based on the indicated latency sensitive traffic priority. In some instances, the indicated latency sensitive traffic priority may correspond to one or more selected traffic identifiers (TIDs). For example, the one or more selected TIDs may be associated with a voice access category (AC_VO). In some other instances, the indicated latency sensitive traffic priority may correspond to a selected traffic flow. For example, the selected traffic flow may be identified by an IP 5-tuple or an IPv6 flow label.

In some implementations, the frame may be one or more of a beacon frame, a probe response frame, an association frame, or a re-association frame, and may include one or more TWT parameters associated with the restricted TWT session. In some instances, the one or more TWT parameters may be included in a TWT Parameter Information field of a TWT element carried in one or more beacon frames transmitted from the AP. In some other instances, the one or more TWT parameters may indicate whether the restricted TWT session is a peer-to-peer TWT session. In addition, or in the alternative, the one or more TWT parameters may indicate whether the restricted TWT session is full.

In some other implementations, establishing the restricted TWT session may also include verifying that each of the one or more STAs is associated with the indicated latency sensitive traffic priority, and joining the one or more STAs to the restricted TWT session based on their respective verifications. In addition, or in the alternative, establishing the restricted TWT session may also include determining a periodicity of the latency sensitive traffic associated with at least one of the one or more STAs, and configuring a TWT interval based on the determined periodicity.

Another innovative aspect of the subject matter described in this disclosure can be implemented in a wireless communication device operating as an AP. The AP may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to establish a restricted TWT session on a wireless medium for one or more STAs associated with latency sensitive traffic. The restricted TWT session may include one or more restricted TWT SPs for communications on the wireless medium with only the one or more STAs associated with the latency sensitive traffic. Execution of the processor-readable code may be configured to transmit a CTS frame on the wireless medium at a start of each restricted TWT SP of the one or more restricted TWT SPs. The CTS frame may indicate to other STAs that the wireless medium is unavailable for a duration of the respective restricted TWT SP. Execution of the processor-readable code may be configured to transmit latency sensitive data to or receive latency sensitive data from the one or more STAs during at least one restricted TWT SP of the one or more restricted TWT SPs. In some implementations, an RA of the CTS frame may be set to a configured MAC address indicating that STAs belonging to the restricted TWT session are permitted to access the wireless medium during the respective restricted TWT SP. In some instances, the configured MAC address may correspond to a configured NAV setting for the other STAs.

In some implementations, execution of the processor-readable code may also be configured to indicate that each of the other STAs is to terminate a TXOP on the wireless medium at or before the start of each restricted TWT SP of the one or more restricted TWT SPs. In some other implementations, execution of the processor-readable code may also be configured to indicate that each of the other STAs is not permitted to access the wireless medium during each restricted TWT SP of the one or more restricted TWT SPs. In some instances, the indications may be included in a TWT Parameter Information field of a TWT element carried in one or more beacon frames transmitted from the AP.

In some implementations, execution of the processor-readable code may also be configured to detect an absence of data transmissions from the one or more STAs for more than a time period during a respective restricted TWT SP, and to release control of the wireless medium during a remaining portion of the respective restricted TWT SP based on detecting the absence of data transmissions from the one or more STAs. In some instances, releasing control of the wireless medium may include transmitting a CF-END frame on the wireless medium.

In some implementations, establishing the restricted TWT session may include transmitting a frame indicating a latency sensitive traffic priority associated with the restricted TWT session, and receiving, from each of the one or more STAs, a request to become members of the restricted TWT session based on the indicated latency sensitive traffic priority. In some instances, the indicated latency sensitive traffic priority may correspond to one or more selected TIDs. For example, the one or more selected TIDs may be associated with a voice access category (AC_VO). In some other instances, the indicated latency sensitive traffic priority may correspond to a selected traffic flow. For example, the selected traffic flow may be identified by an IP 5-tuple or an IPv6 flow label.

In some implementations, the frame may be one or more of a beacon frame, a probe response frame, an association frame, or a re-association frame, and may include one or more TWT parameters associated with the restricted TWT session. In some instances, the one or more TWT parameters may be included in a TWT Parameter Information field of a TWT element carried in one or more beacon frames transmitted from the AP. In some other instances, the one or more TWT parameters may indicate whether the restricted TWT session is a peer-to-peer TWT session. In addition, or in the alternative, the one or more TWT parameters may indicate whether the restricted TWT session is full.

In some other implementations, establishing the restricted TWT session may also include verifying that each of the one or more STAs is associated with the indicated latency sensitive traffic priority, and joining the one or more STAs to the restricted TWT session based on their respective verifications. In addition, or in the alternative, establishing the restricted TWT session may also include determining a periodicity of the latency sensitive traffic associated with at least one of the one or more STAs, and configuring a TWT interval based on the determined periodicity.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 7A shows a flowchart illustrating an example process for wireless communication that supports restricted TWT sessions according to some implementations.

FIG. 7B shows a flowchart illustrating an example process for wireless communication that supports restricted TWT sessions according to some implementations.

FIG. 7C shows a flowchart illustrating an example process for wireless communication that supports restricted TWT sessions according to some implementations.

Like reference numbers and designations in the various drawings indicate like elements.

DETAILED DESCRIPTION

Figure 1:
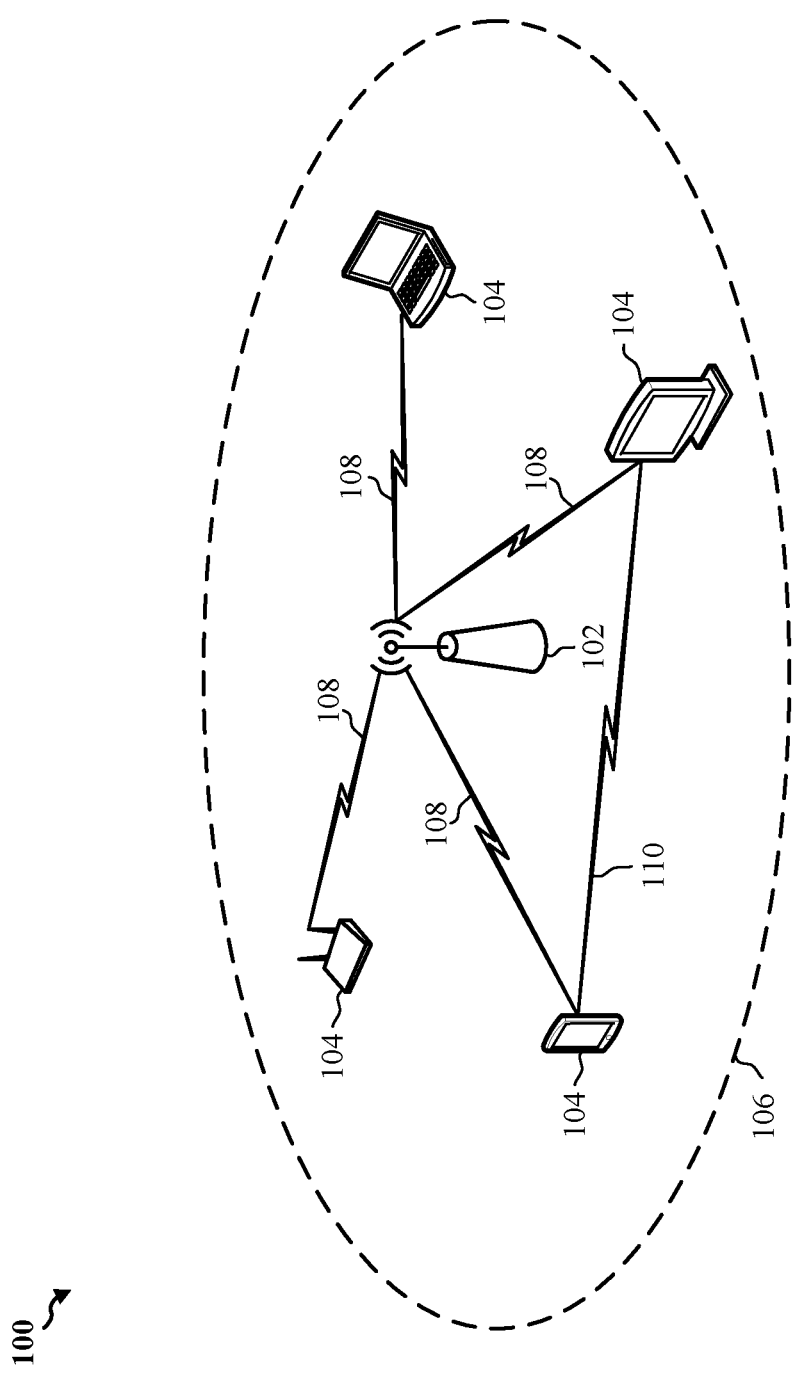
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth R; standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to restricted target wake time (TWT) sessions on a wireless medium. Some implementations more specifically relate to establishing a restricted TWT session for wireless stations having or associated with latency sensitive traffic having strict end-to-end latency and packet loss requirements. In accordance with some aspects of the present disclosure, an AP may establish or schedule a restricted target wake time (TWT) session on a wireless medium for one or more wireless stations (STAs) associated with latency sensitive traffic. The restricted TWT session may include a plurality of restricted TWT service periods (SPs) for communications on the wireless medium with only the one or more STAs associated with the latency sensitive traffic. The AP may transmit a clear-to-send (CTS) frame on the wireless medium at a start of each restricted TWT SP to prevent contention on the wireless medium. In some instances, the AP may set the receiver address (RA) of the CTS frame to a configured medium access control (MAC) address indicating that STAs belonging to the restricted TWT session are allowed to access the wireless medium during the respective restricted TWT SP, and may therefore ignore the CTS frame. Setting the RA of the CTS frame to the configured MAC address may also indicate a certain value to which other STAs that do not belong to the restricted TWT session may set their respective network allocation vectors (NAVs).

In some implementations, the AP may transmit a frame including one or more TWT parameters associated with the restricted TWT session. The frame, which may be a beacon frame, a probe response frame, an association frame, or a re-association frame, may also indicate a latency sensitive traffic priority associated with the restricted TWT session. In some instances, the indicated latency sensitive traffic priority may correspond to one or more selected traffic identifiers (TIDs). The selected TIDs may be associated with a certain access category (such as a voice access category), may correspond to a selected traffic flow, or may correspond to a configured label.

Particular aspects of the subject matter described in this disclosure can be implemented to realize one or more of the following potential advantages. As discussed, traffic originating from many real-time applications can have stringent latency requirements (e.g., very low average latency, worst case latency on the order of a few to tens of milliseconds, and small jitter). In some aspects, the described techniques provide enhanced medium access and resource reservation mechanisms. For example, by establishing a restricted TWT session for STAs having or associated with latency sensitive traffic (such as gaming traffic), the AP may provide STAs that are members of the restricted TWT session with more predictable latency, reduced worst-case latency, and reduced jitter. In this way, the AP may ensure that such STAs are afforded sufficient access to the wireless medium to meet the strict end-to-end latency and packet loss requirements associated with the latency sensitive traffic.

FIG. 1 shows a block diagram of an example wireless communication network such as a wireless local area network (WLAN) 100. In some aspects, the wireless communication network may be referred to as a Wi-Fi network. For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHZ, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHZ band, and the 900 MHz band. Some implementations of the APs 102 and STAs 104 described herein also may communicate in other frequency bands, such as the 6.0 GHZ band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHZ bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHZ, 80 MHZ, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
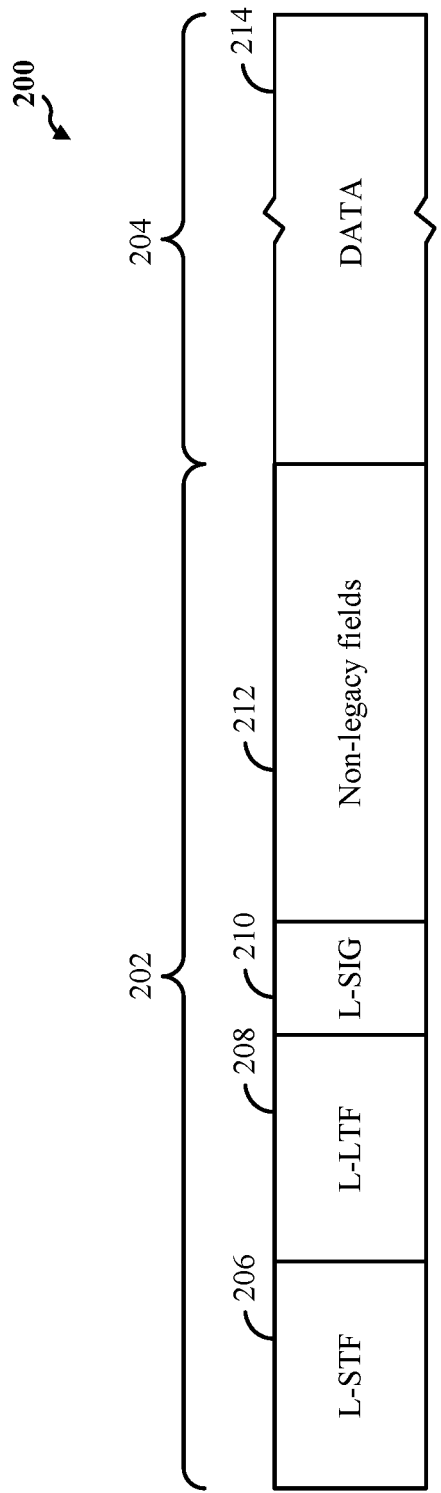
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
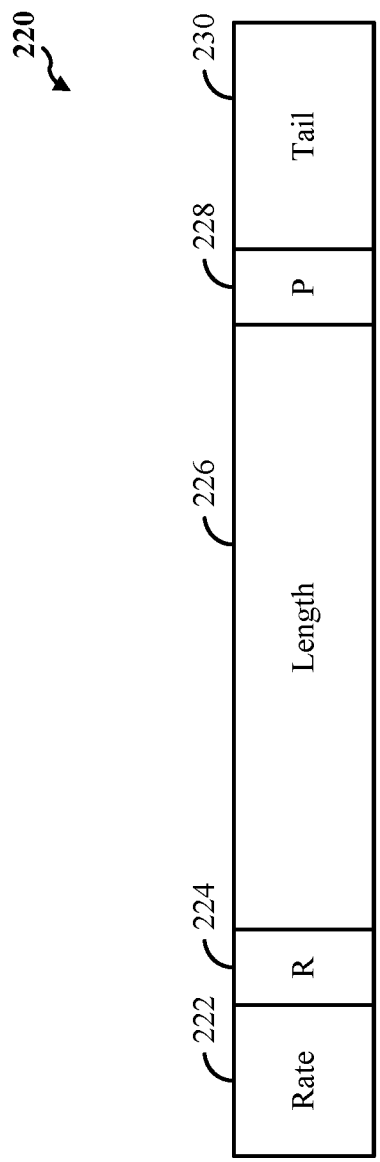
FIG. 2B shows an example field in the PDU of FIG. 2A.

FIG. 2B shows an example L-SIG 220 in the PDU of FIG. 2A. The L-SIG 220 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

Figure 3:
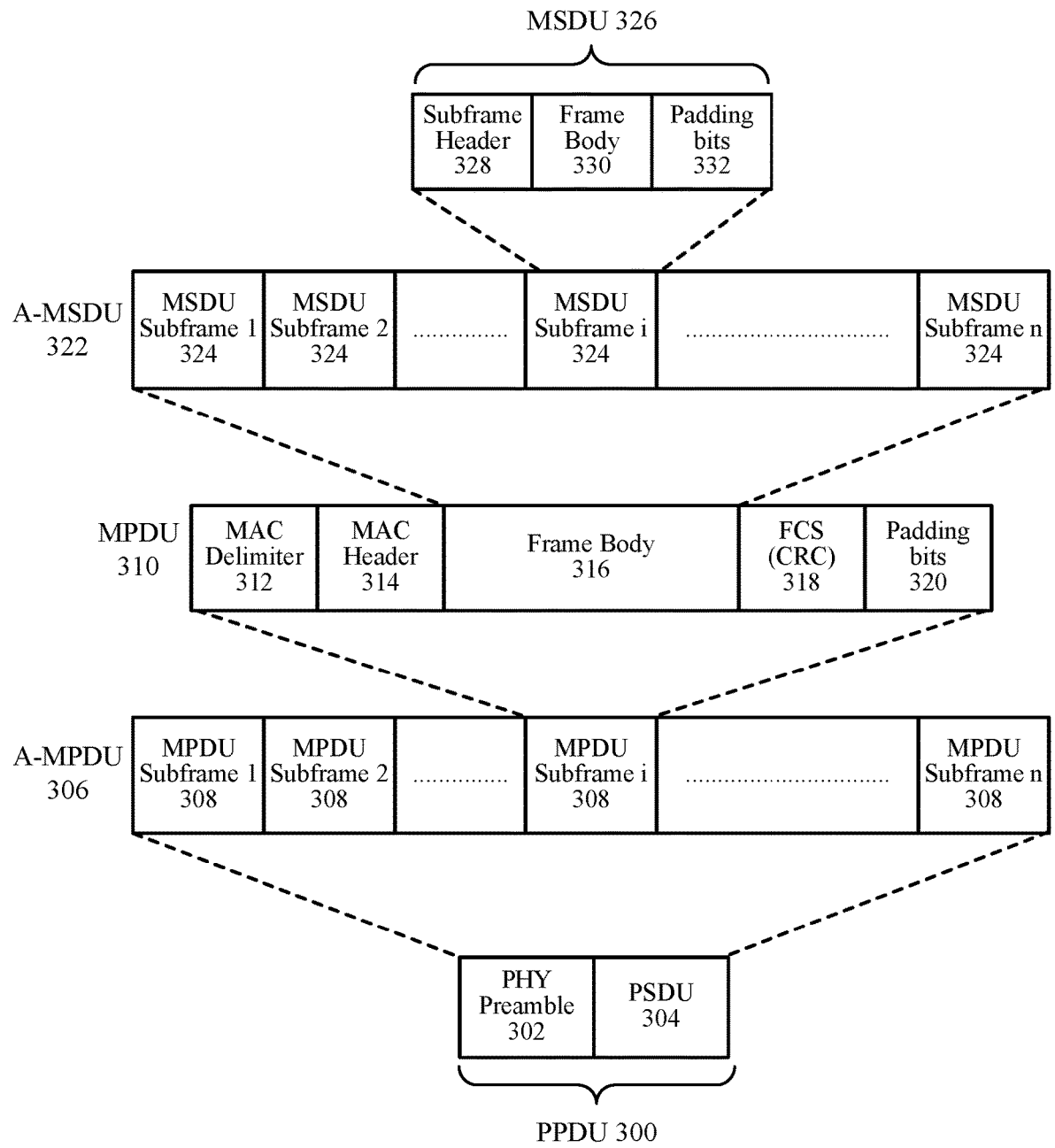
FIG. 3 shows an example physical layer convergence protocol (PLCP) protocol data unit (PPDU) usable for communications between an AP and a number of STAs.

FIG. 3 shows an example PPDU 300 usable for communications between an AP 102 and a number of STAs 104. As described above, each PPDU 300 includes a PHY preamble 302 and a PSDU 304. Each PSDU 304 may carry one or more MAC protocol data units (MPDUs). For example, each PSDU 304 may carry an aggregated MPDU (A-MPDU) 306 that includes an aggregation of multiple MPDU subframes 308. Each MPDU subframe 308 may carry an MPDU 310 that may include a MAC delimiter 312 and a MAC header 314 prior to the accompanying frame body 316, which includes the data portion or "payload" of the MPDU 310. The frame body 316 may carry one or more MAC service data unit (MSDU) subframes. For example, the frame body 316 may carry an aggregated MSDU (A-MSDU) 322 including multiple MSDU subframes 324. Each MSDU subframe 324 contains a corresponding MSDU 326 including a subframe header 328, a frame body 330, and one or more padding bits 332.

Referring back to the MPDU 310, the MAC header 314 may include a number of fields containing information that defines or indicates characteristics or attributes of data encapsulated within the frame body 316. The MAC header 314 also includes a number of fields indicating addresses for the data encapsulated within the frame body 316. For example, the MAC header 314 may include a combination of a source address, a transmitter address, a receiver address, or a destination address. The MAC header 314 may include a frame control field containing control information. The frame control field specifies the frame type, for example, a data frame, a control frame, or a management frame. The MAC header 314 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each MPDU 310 may also include a frame check sequence (FCS) field 318 for error detection. For example, the FCS field 318 may include a cyclic redundancy check (CRC), and may be followed by one or more padding bits 320.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUS) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHZ, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDS), and may assign each AID (and thus each STA 104) one or more RUs that can be used to send UL traffic to the AP 102. The AP also may designate one or more random access (RA) RUs that unscheduled STAs 104 may contend for.

Figure 4:
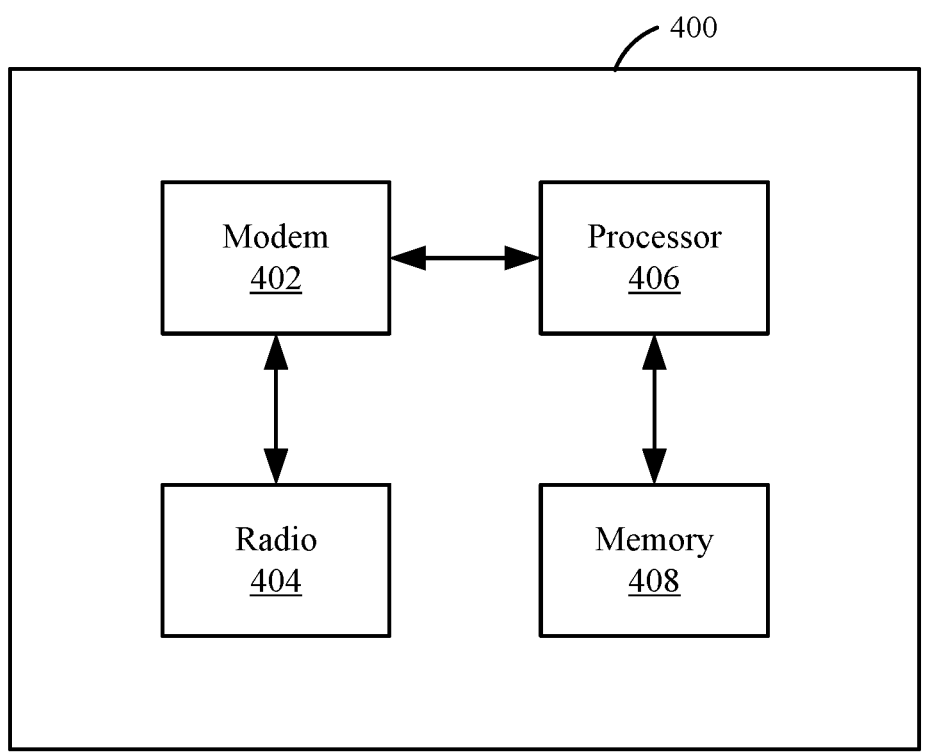
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 400 further includes one or more processors, processing blocks or processing elements 406 (collectively "the processor 406"), and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrow band signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation, or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 5B:
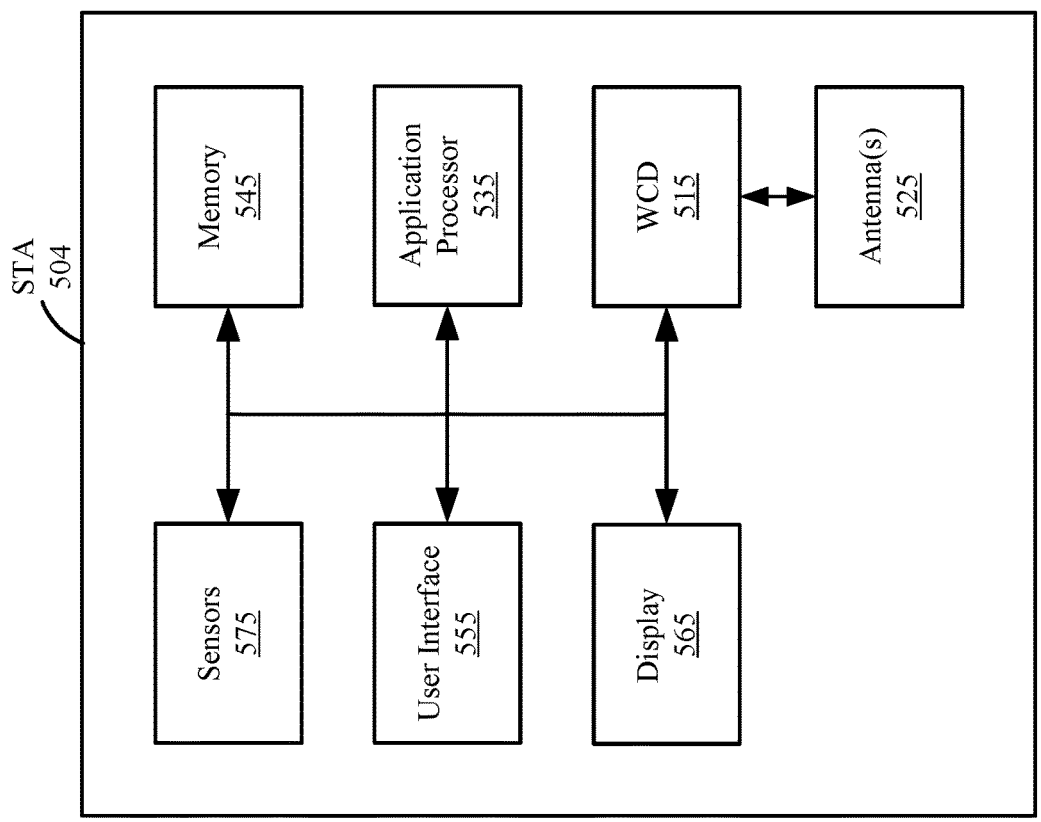
FIG. 5B shows a block diagram of an example station (STA).
Figure 5A:
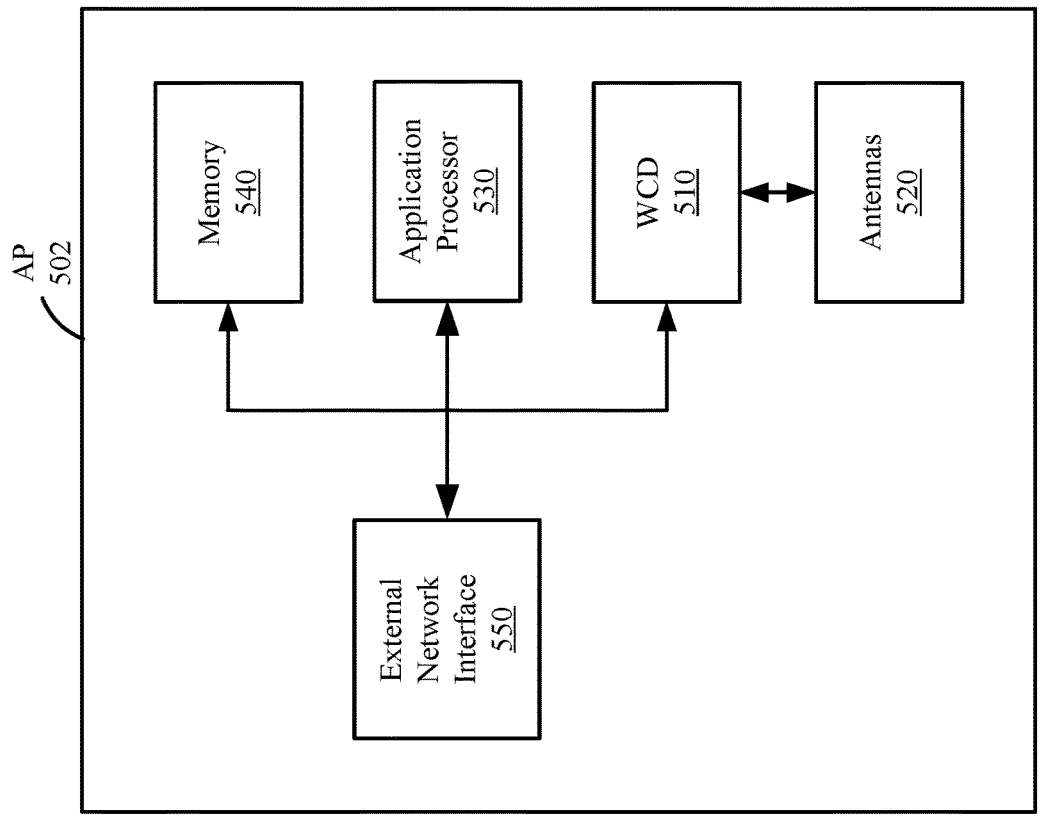
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of one or more of the STAs 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing (not shown for simplicity) that encompasses the wireless communication device 515, the application processor 535, the memory 545, and at least portions of the antennas 525, UI 555, and display 565.

Figure 6:
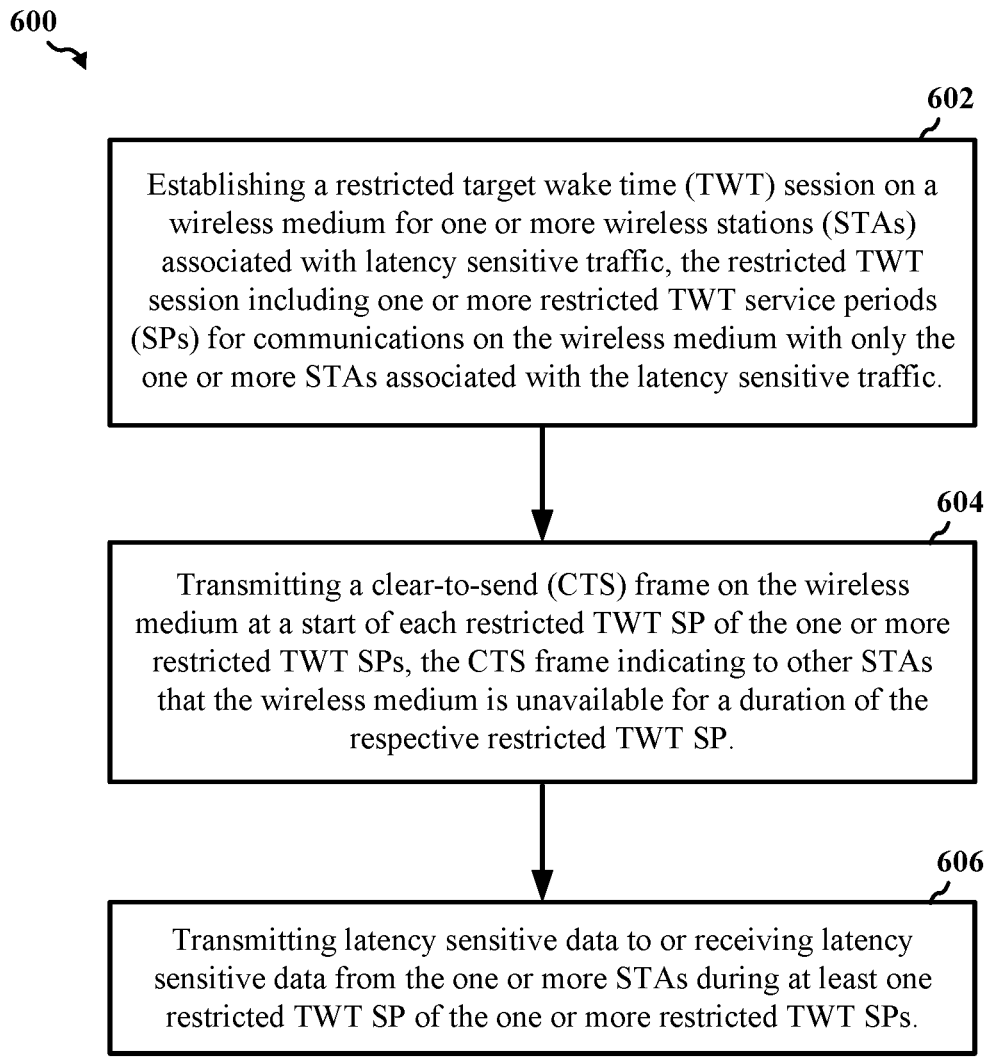
FIG. 6 shows a flowchart illustrating an example process for wireless communication that supports restricted target wake time (TWT) sessions according to some implementations.

FIG. 6 shows a flowchart illustrating an example process 600 for wireless communication that supports restricted TWT sessions according to some implementations. The process 600 may be performed by a wireless communication device such as the wireless communication device 400 described above with reference to FIG. 4. In some implementations, the process 600 may be performed by a wireless communication device operating as or within an AP, such as one of the APs 102 and 502 described above with reference to FIGS. 1 and 5A, respectively.

In some implementations, the process 600 begins in block 602 with establishing a restricted target wake time (TWT) session on a wireless medium for one or more wireless stations (STAs) associated with latency sensitive traffic, the restricted TWT session including one or more restricted TWT service periods (SPs) for communications on the wireless medium with only the one or more STAs associated with the latency sensitive traffic. In block 604, the process 600 proceeds with transmitting a clear-to-send (CTS) frame on the wireless medium at a start of each restricted TWT SP of the one or more restricted TWT SPs, the CTS frame indicating to other STAs that the wireless medium is busy or unavailable for a duration of the respective restricted TWT SP. In block 606, the process 600 proceeds with transmitting latency sensitive data to, or receiving latency sensitive data from, the one or more STAs during at least one restricted TWT SP of the one or more restricted TWT SPs.

In some implementations, a receiver address (RA) of the CTS frame is set to a configured medium access control (MAC) address indicating that STAs belonging to the restricted TWT session are permitted to access the wireless medium during the respective restricted TWT SP. In some instances, the configured MAC address corresponds to a configured network allocation vector (NAV) setting for the other STAs.

FIG. 7A shows a flowchart illustrating an example process 700 for wireless communication that supports restricted TWT sessions according to some implementations. The process 700 may be performed by a wireless communication device such as the wireless communication device 400 described above with reference to FIG. 4. In some implementations, the process 700 may be performed by a wireless communication device operating as or within an AP, such as one of the APs 102 and 502 described above with reference to FIGS. 1 and 5A, respectively. In some instances, the process 700 may be performed after establishing the restricted TWT session in block 602 of FIG. 6. For example, at block 702, the process 700 includes indicating that each of the other STAs is to terminate a transmit opportunity (TXOP) on the wireless medium at or before the start of each restricted TWT SP of the one or more restricted TWT SPs. In some instances, the indication may be included in a TWT Element carried in one or more beacon frames transmitted from the AP. In some other instances, the indication may be included in another field of the beacon frames, or may be included in another suitable management frame transmitted from the AP.

FIG. 7B shows a flowchart illustrating an example process 710 for wireless communication that supports restricted TWT sessions according to some implementations. The process 710 may be performed by a wireless communication device such as the wireless communication device 400 described above with reference to FIG. 4. In some implementations, the process 710 may be performed by a wireless communication device operating as or within an AP, such as one of the APs 102 and 502 described above with reference to FIGS. 1 and 5A, respectively. In some instances, the process 710 may be performed after establishing the restricted TWT session in block 602 of FIG. 6. For example, at block 712, the process 710 includes indicating that each of the other STAs is not permitted to access the wireless medium during each restricted TWT SP of the one or more restricted TWT SPs. In some instances, the indication may be included in a TWT Element carried in one or more beacon frames transmitted from the AP. In some other instances, the indication may be included in another field of the beacon frames, or may be included in another suitable management frame transmitted from the AP.

FIG. 7C shows a flowchart illustrating an example process 720 for wireless communication that supports restricted TWT sessions according to some implementations. The process 720 may be performed by a wireless communication device such as the wireless communication device 400 described above with reference to FIG. 4. In some implementations, the process 720 may be performed by a wireless communication device operating as or within an AP, such as one of the APs 102 and 502 described above with reference to FIGS. 1 and 5A, respectively. In some instances, the process 720 may be performed after transmitting or receiving the latency sensitive data in block 606 of FIG. 6. For example, at block 722, the process 720 includes permitting one or more of the other STAs to access the wireless medium during time periods outside the one or more restricted TWT SPs of the restricted TWT session.

Figure 8:
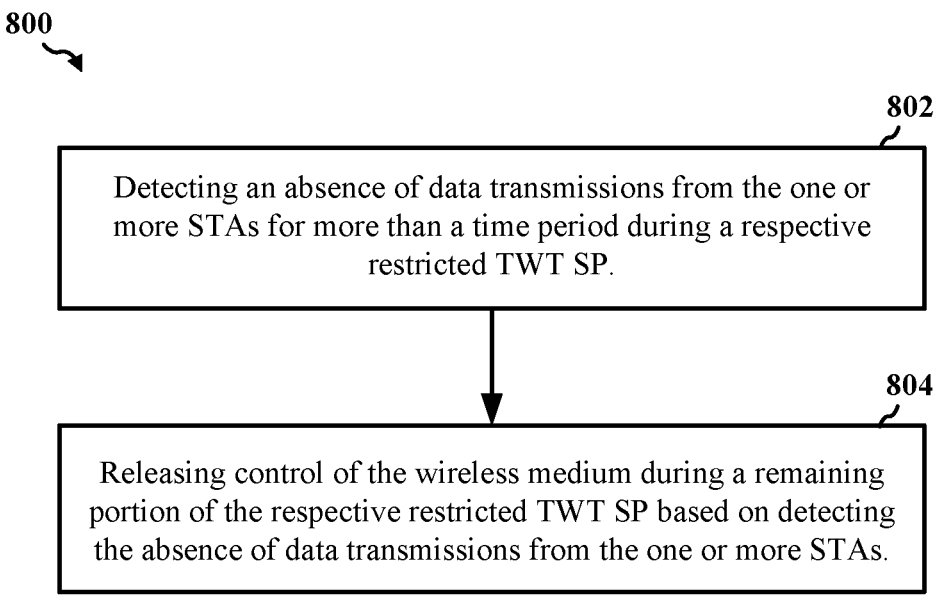
FIG. 8 shows a flowchart illustrating an example process for wireless communication that supports restricted TWT sessions according to some implementations.

FIG. 8 shows a flowchart illustrating an example process 800 for wireless communication that supports restricted TWT sessions according to some implementations. The process 800 may be performed by a wireless communication device such as the wireless communication device 400 described above with reference to FIG. 4. In some implementations, the process 800 may be performed by a wireless communication device operating as or within an AP, such as one of the APs 102 and 502 described above with reference to FIGS. 1 and 5A, respectively. In some instances, the process 800 may be performed after establishing the restricted TWT session in block 602 of FIG. 6. For example, at block 802, the process 800 begins with detecting an absence of data transmissions from the one or more STAs for more than a time period during a respective restricted TWT SP. At block 804, the process 800 proceeds with releasing control of the wireless medium during a remaining portion of the respective restricted TWT SP based on detecting the absence of data transmissions from the one or more STAs. In some instances, the AP may release control of the wireless medium by transmitting a contention-free end (CF-END) frame on the wireless medium, which may signal an end of the respective restricted TWT SP.

Figure 9:
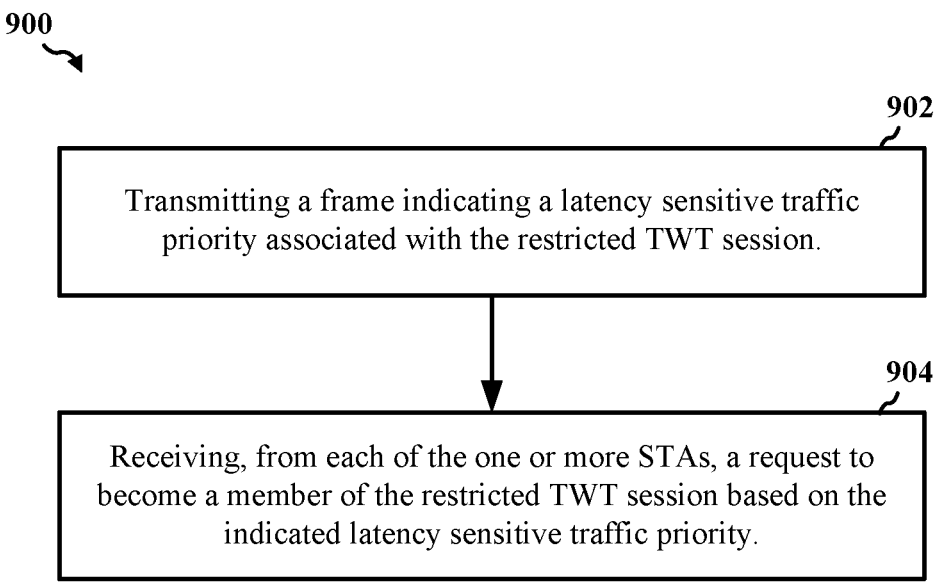
FIG. 9 shows a flowchart illustrating an example process for wireless communication that supports restricted TWT sessions according to some implementations.

FIG. 9 shows a flowchart illustrating an example process 900 for wireless communication that supports restricted TWT sessions according to some implementations. The process 900 may be performed by a wireless communication device such as the wireless communication device 400 described above with reference to FIG. 4. In some implementations, the process 900 may be performed by a wireless communication device operating as or within an AP, such as one of the APs 102 and 502 described above with reference to FIGS. 1 and 5A, respectively. In some instances, the process 900 may be one implementation of establishing the restricted TWT session in block 602 of FIG. 6. For example, at block 902, the process 900 begins with transmitting a frame indicating a latency sensitive traffic priority associated with the restricted TWT session. At block 904, the process 900 proceeds with receiving, from each of the one or more STAs, a request to become a member of the restricted TWT session based on the indicated latency sensitive traffic priority.

In some implementations, the indicated latency sensitive traffic priority may correspond to one or more selected traffic identifiers (TIDs). In some instances, the one or more selected TIDs may be associated with a voice access category (AC_VO). In some other instances, the one or more selected TIDs may be associated with another access category. In some other implementations, the indicated latency sensitive traffic priority may correspond to a selected traffic flow. In some instances, the selected traffic flow may be identified by an IP 5-tuple or an IPv6 flow label.

In some implementations, the frame may be one or more of a beacon frame, a probe response frame, an association frame, or a re-association frame. In some instances, the frame may include one or more TWT parameters associated with the restricted TWT session. The one or more TWT parameters may be included in a TWT Parameter Information field of a TWT element carried in one or more beacon frames transmitted by the AP. In some instances, the one or more TWT parameters may indicate whether the restricted TWT session is a peer-to-peer TWT session. In some other instances, the one or more TWT parameters may indicate whether the restricted TWT session is full.

Figure 10:
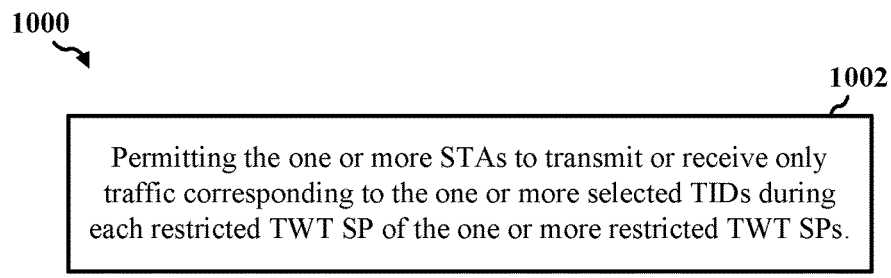
FIG. 10 shows a flowchart illustrating an example process for wireless communication that supports restricted TWT sessions according to some implementations.

FIG. 10 shows a flowchart illustrating an example process 1000 for wireless communication that supports restricted TWT sessions according to some implementations. The process 1000 may be performed by a wireless communication device such as the wireless communication device 400 described above with reference to FIG. 4. In some implementations, the process 1000 may be performed by a wireless communication device operating as or within an AP, such as one of the APs 102 and 502 described above with reference to FIGS. 1 and 5A, respectively. In some instances, the process 1000 may be performed after establishing the restricted TWT session in block 602 of FIG. 6. For example, at block 1002, the process 1000 includes permitting the one or more STAs to transmit or receive only traffic corresponding to the one or more selected TIDs during each restricted TWT SP of the one or more restricted TWT SPs.

Figure 11:
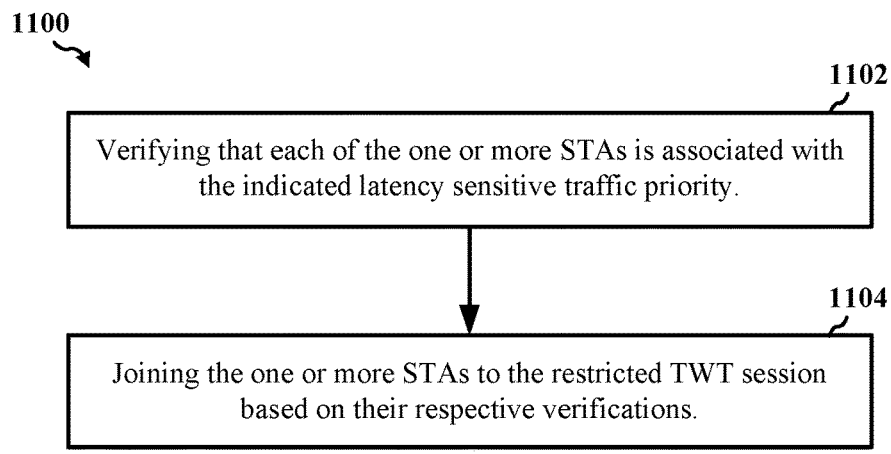
FIG. 11 shows a flowchart illustrating an example process for wireless communication that supports restricted TWT sessions according to some implementations.

FIG. 11 shows a flowchart illustrating an example process 1100 for wireless communication that supports restricted TWT sessions according to some implementations. The process 1100 may be performed by a wireless communication device such as the wireless communication device 400 described above with reference to FIG. 4. In some implementations, the process 1100 may be performed by a wireless communication device operating as or within an AP, such as one of the APs 102 and 502 described above with reference to FIGS. 1 and 5A, respectively. In some instances, the process 1100 may be performed before or concurrently with establishing the restricted TWT session in block 602 of FIG. 6. For example, at block 1102, the process 1100 begins with verifying that each of the one or more STAs is associated with the indicated latency sensitive traffic priority. At block 1104, the process 1100 proceeds with joining the one or more STAs to the restricted TWT session based on their respective verifications.

Figure 12:
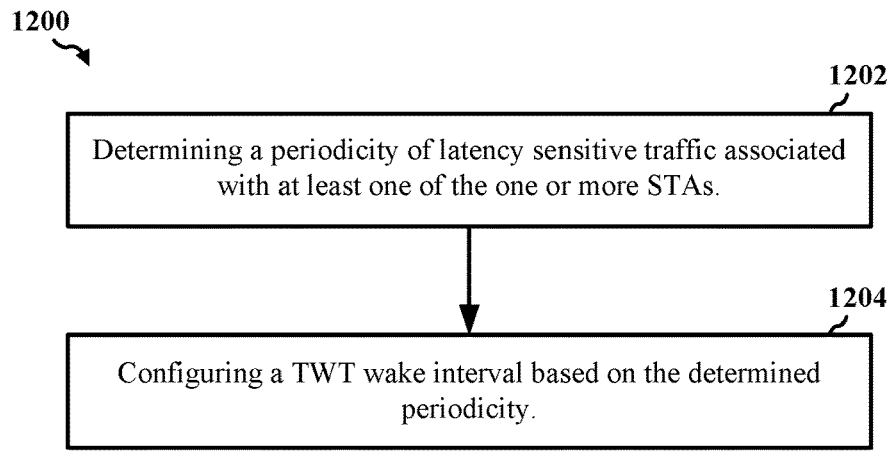
FIG. 12 shows a flowchart illustrating an example process for wireless communication that supports restricted TWT sessions according to some implementations.

FIG. 12 shows a flowchart illustrating an example process 1200 for wireless communication that supports restricted TWT sessions according to some implementations. The process 1200 may be performed by a wireless communication device such as the wireless communication device 400 described above with reference to FIG. 4. In some implementations, the process 1200 may be performed by a wireless communication device operating as or within an AP, such as one of the APs 102 and 502 described above with reference to FIGS. 1 and 5A, respectively. In some instances, the process 1200 may be one implementation of establishing the restricted TWT session in block 602 of FIG. 6. For example, at block 1202, the process 1200 begins with determining a periodicity of the latency sensitive traffic associated with at least one of the one or more STAs. At block 1204, the process 1200 proceeds with configuring a TWT wake interval based on the determined periodicity.

Figure 13A:
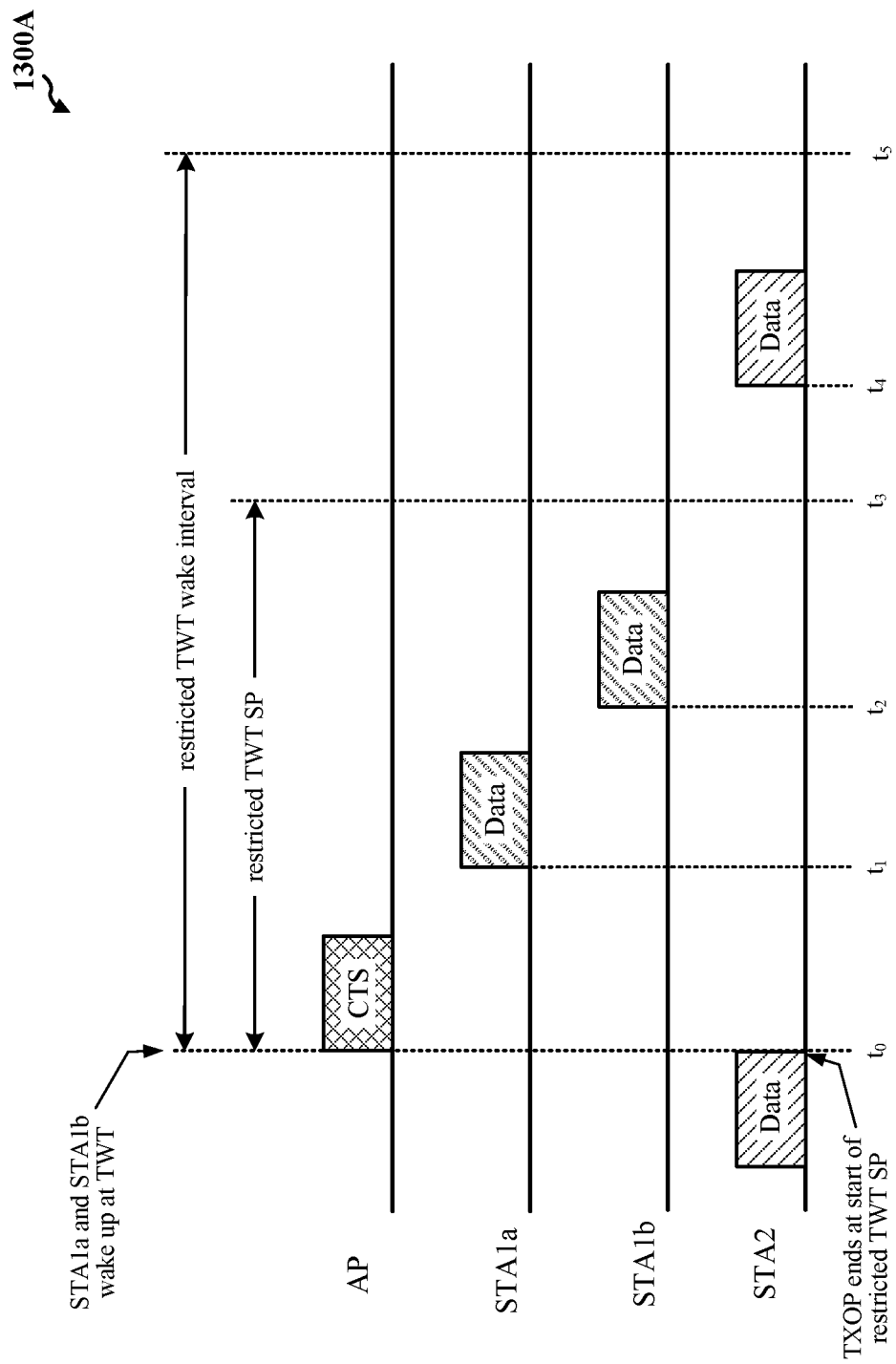
FIG. 13A shows a timing diagram illustrating the transmissions of communications that support restricted TWT sessions according to some implementations.

FIG. 13A shows a timing diagram 1300A illustrating the transmissions of communications that support restricted TWT sessions according to some implementations. The communications shown in the timing diagram 1300A are exchanged between an AP, two wireless stations STA1a and STA1b that are associated with latency sensitive traffic and that are members of a TWT session established by the AP, and another wireless station STA2 that is not associated with latency sensitive traffic and that is not a member of the TWT session established by the AP. As such, stations STA1a and STA1b may be referred to herein as latency sensitive STAs, and station STA2 may be referred to herein as a non-latency sensitive STA. The AP may be one example of the APs 102 and 502 described above with reference to FIGS. 1 and 5A, respectively. Each of the wireless stations STA1a, STA1b, and STA2 may be one example of the STAs 104 and 504 described above with reference to FIGS. 1 and 5B, respectively.

For simplicity, only two stations STA1a and STA1b are shown as members of the restricted TWT session, and only one station STA2 is shown to be associated with the AP but not a member of the restricted TWT session. In some other implementations, the restricted TWT session may include fewer or more STAs than those depicted in the example of FIG. 13A.

Prior to time to, the AP may establish the restricted TWT session for one or more STAs associated with latency sensitive traffic. The restricted TWT session may include one or more restricted TWT service periods (SPs) for communications on the wireless medium with only for STAs that are associated with latency sensitive traffic and that are members of the restricted TWT session. As discussed, each of stations STA1a and STA1b is associated with latency sensitive traffic and is a member of the restricted TWT session; station STA2 is not associated with latency sensitive traffic and is not a member of the restricted TWT session.

The AP may advertise the restricted TWT session by including a TWT Element in beacon frames broadcasted to its associated STAs. The TWT Element may indicate the existence of the restricted TWT session, may indicate that the restricted TWT session is associated with latency sensitive traffic, and may indicate one or more parameters of the restricted TWT session. For example, the one or more parameters may indicate a duration of the restricted TWT SPs, may indicate a duration of the restricted TWT wake interval, may indicate whether the restricted TWT session is a broadcast TWT session or an individual TWT session, may indicate whether the restricted TWT session is a peer-to-peer TWT session, may indicate the operating channel, may indicate the target wake times, and may indicate other TWT information.

In some implementations, the TWT Element may indicate that the restricted TWT session is for STAs that have or are associated with latency sensitive traffic corresponding to one or more selected traffic identifiers (TIDs). For example, in some instances, the selected TIDs may be associated with a voice access category (AC_VO). In some other implementations, the TWT Element may indicate that the restricted TWT session is for STAs that have or are associated with latency sensitive traffic corresponding to a configured label or to a selected traffic flow. For example, in some instances, the configured label or the selected traffic flow may be identified by an IP 5-tuple or an IPv6 flow label. The stations STA1a and STA1b may receive the TWT Element, and may request the AP to add or join STA1a and STA1b to the restricted TWT session. In some instances, the requests sent by stations STA1a and STA1b may indicate that the respective stations STA1a and STA1b have latency sensitive traffic corresponding to the selected TIDs indicated in the TWT Element. The AP may verify that the TID(s) associated with the respective traffic flows of stations STA1a and STA1b match the selected TIDs indicated in the TWT Element before allowing the stations STA1a and STA1b to join the restricted TWT session.

In some instances, the TWT element may also include an indication for other STAs (such as STA2) to terminate their respective TXOPs on the wireless medium at or before the start of each restricted TWT SP of the restricted TWT session. For example, STA2 may receive one or more beacon frames broadcast from the AP, may decode the TWT Element, and may terminate its transmission of UL data at or before time to based on the indication. In some instances, the indication to terminate TXOPs may be carried in the TWT Parameter Information field of the TWT element.

At time $t_0$, which corresponds to the start of the restricted TWT SP, the stations STA1a and STA1b wake up, and the AP transmits a clear-to-send (CTS) frame on the wireless medium. The CTS frame may indicate to STA2 (and other STAs which do not belong to the restricted TWT session) that the wireless medium is unavailable for the duration of the restricted TWT SP. Station STA2 (and the other STAs) receives the CTS frame and does not access the wireless medium during the restricted TWT SP, for example, by setting its NAV to a time period corresponding to the duration of the restricted TWT SP. In some instances, the AP may set the receiver address (RA) of the CTS frame to a configured MAC address that indicates a certain value to which STA2 and other non-participating STAs may set their respective NAVs. Setting the RA of the CTS frame to the configured MAC address may also indicate that the stations STA1a and STA1b (and additional STAs that have joined the restricted TWT session) can ignore the CTS frame (and therefore do not set their NAVs).

As shown, STA1a transmits UL data on the wireless medium to the AP at time $t_1$, and STA1b transmits UL data on the wireless medium to the AP at time $t_2$. In some other implementations, stations STA1a and STA1b may concurrently transmit UL data to the AP using any suitable multi-user signaling technique (such as OFDMA or MU-MIMO).

At time $t_3$, the restricted TWT SP ends, and station STA2 may access the wireless medium. In some instances, STA2 may use a contention-based channel access mechanism (such as an EDCA mechanism) to gain access to the wireless medium. In the example of FIG. 13A, STA2 gains access to the wireless medium, and transmits UL data to the AP at time $t_4$. Time $t_5$ may signal an end to the restricted TWT wake interval.

Figure 13B:
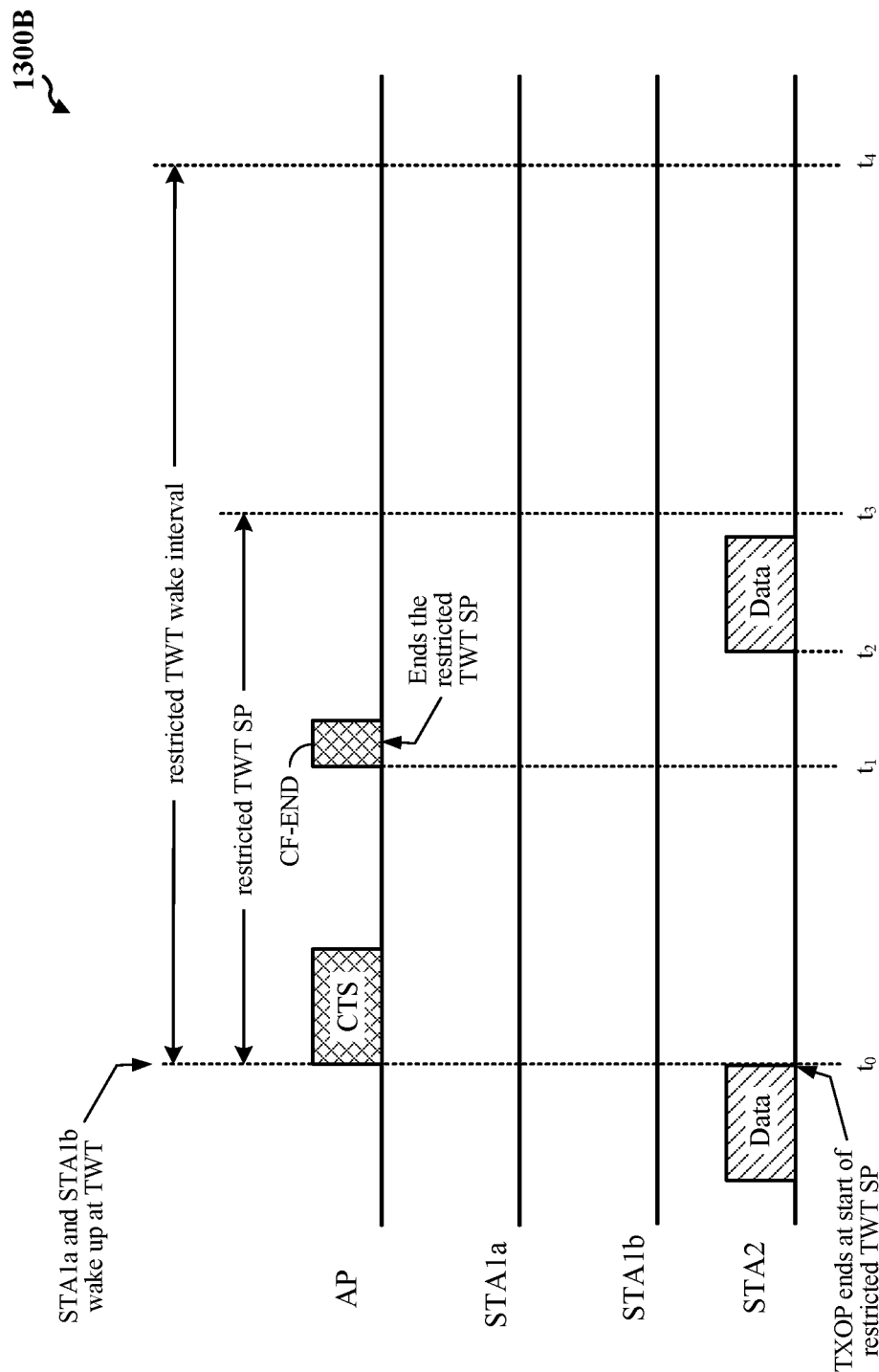
FIG. 13B shows a timing diagram illustrating the transmissions of communications that support restricted TWT sessions according to some other implementations.

FIG. 13B shows a timing diagram 1300B illustrating the transmissions of communications that support restricted TWT sessions according to some other implementations. The timing diagram 1300B of FIG. 13B is similar to the timing diagram 1300A of FIG. 13A, except that in the example of FIG. 13B, the AP detects an absence of data transmissions from stations STA1a and STA1b during the restricted TWT SP. Specifically, the AP may monitor the wireless medium for UL transmissions from the stations STA1a and STA1b during the restricted TWT SP. If the AP does not detect any UL transmissions from the stations STA1a and STA1b for more than a certain time period of the restricted TWT SP, the AP may release the wireless medium. In some instances, the AP may release the wireless medium by transmitting a contention-free end (CF-END) frame that terminates the restricted TWT SP. STA2 receives the CF-END frame, gains access to the wireless medium, and transmits UL data to the AP at time $t_2$. Time $t_3$ indicates the scheduled end of the restricted TWT SP, and time ta indicates the end of the restricted TWT wake interval.

Figure 14A:
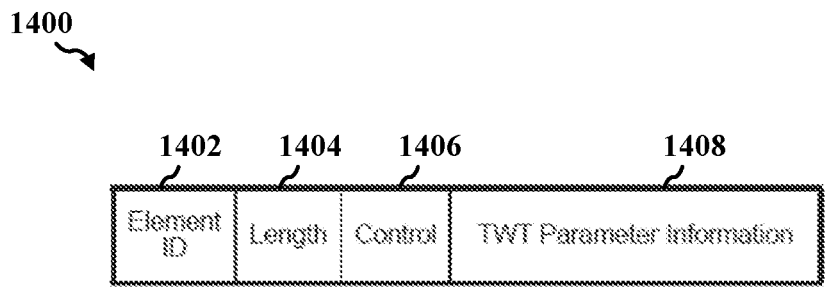
FIG. 14A shows an example structure of a TWT Element usable for wireless communications that support restricted TWT sessions according to some implementations.

FIG. 14A shows an example structure of a TWT Element 1400 usable for wireless communications that support restricted TWT sessions according to some implementations. The TWT Element 1400 may include an element ID field 1402, a length field 1404, a control field 1406, and a TWT parameter information field 1408. The element ID field 1402 indicates that the element is a TWT Element. The length field 1404 indicates a length of the TWT Element 1400. The control field 1406 includes various control information for the restricted TWT session. The TWT parameter information field 1408 contains either a single individual TWT Parameter Set field or one or more Broadcast TWT Parameter Set fields.

Figure 14B:
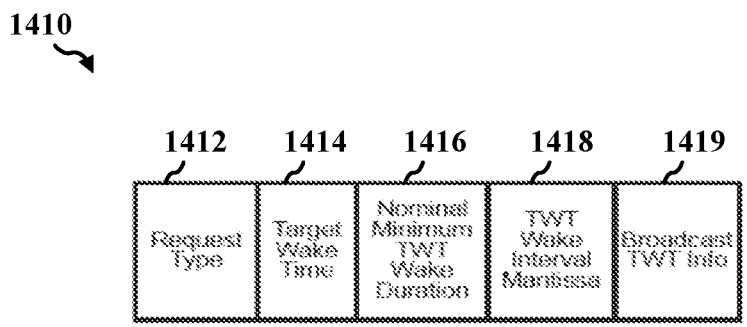
FIG. 14B shows an example structure of a broadcast TWT Parameter Set field usable for wireless communications that support restricted TWT sessions according to some implementations.

FIG. 14B shows an example structure of a broadcast TWT Parameter Set field 1410 usable for wireless communications that support restricted TWT sessions according to some implementations. The broadcast TWT Parameter Set field 1410 may include a request type field 1412, a target wake time field 1414, a nominal minimum TWT wake duration field 1416, a TWT wake interval mantissa field 1418, and a broadcast TWT Info field 1419.

Figure 14C:
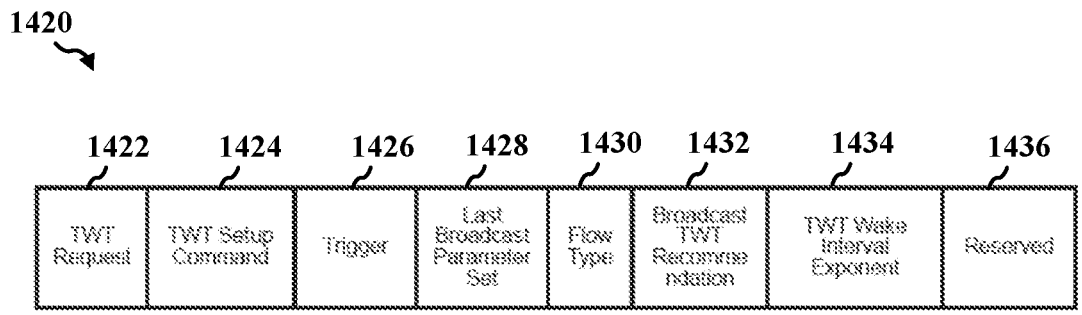
FIG. 14C shows an example structure of a Request Type field in a Broadcast TWT Parameter Set field usable for wireless communications that support restricted TWT sessions according to some implementations.

FIG. 14C shows an example structure of a Request Type field 1420 of a Broadcast TWT Parameter Set field usable for wireless communications that support restricted TWT sessions according to some implementations. The Request Type field 1420 may include a TWT request field 1422, a TWT setup command field 1424, a trigger field 1426, a last broadcast parameter set field 1428, a flow type field 1430, a broadcast TWT recommendation field 1432, a TWT wake interval exponent field 1434, and a number of reserved bits 1436. In some implementations, the broadcast TWT recommendation field 1432 may indicates whether the restricted TWT session is a peer-to-peer TWT session or a broadcast TWT session.

Figure 15:
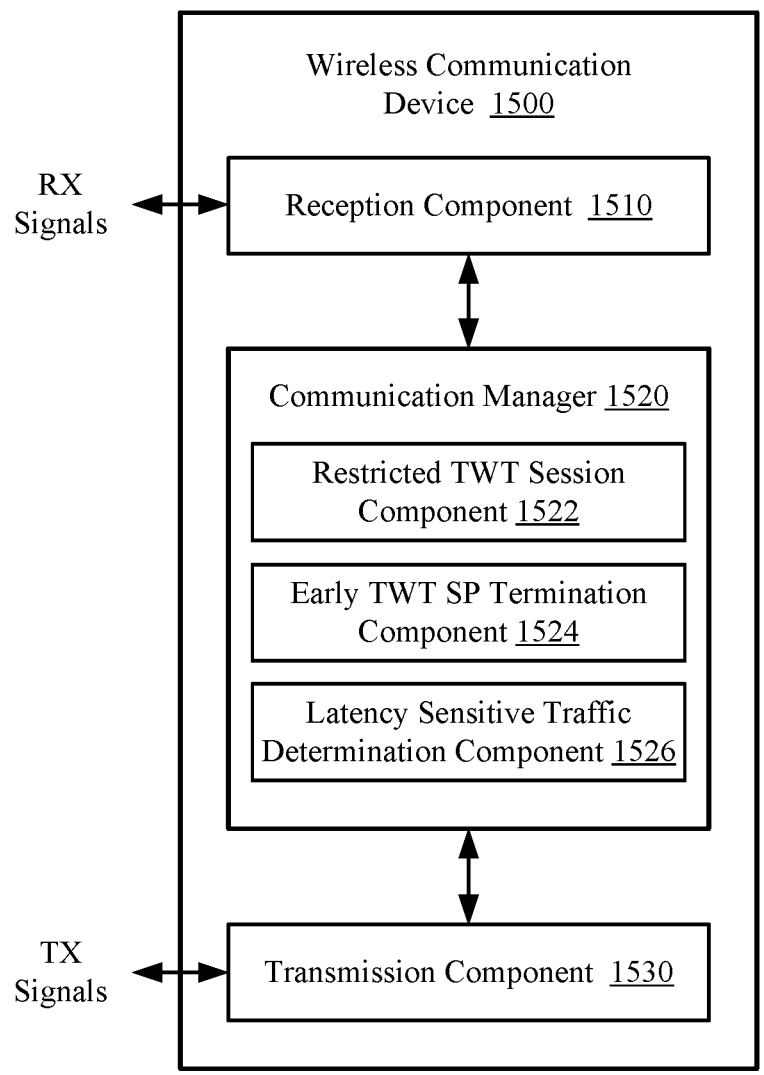
FIG. 15 shows a block diagram of an example wireless communication device according to some implementations.

FIG. 15 shows a block diagram of an example wireless communication device 1500 according to some implementations. In some implementations, the wireless communication device 1500 is configured to perform one or more of the processes described above with reference to FIGS. 6, 7A-7C, 8, 9, 10, 11, and 12. In some implementations, the wireless communication device 1500 can be an example implementation of the wireless communication device 400 described above with reference to FIG. 4. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 may further include a restricted TWT session component 1522, an early TWT SP termination component 1524, and a latency sensitive traffic determination component 1526. Portions of one or more of the components 1522, 1524, and 1526 may be implemented at least in part in hardware or firmware. In some implementations, at least one of the components 1522, 1524, or 1526 is implemented at least in part as software stored in a memory (such as the memory 408). For example, portions of one or more of the components 1522, 1524, and 1526 can be implemented as non-transitory instructions or code executable by a processor (such as the processor 406) to perform the functions or operations of the respective component.

The reception component 1510 is configured to receive RX signals from other wireless communication devices. In some implementations, the RX signals may include UL data from one or more STAs belonging to a restricted TWT session (such as latency sensitive STAs), may include UL data from one or more other STAs (such as non-latency sensitive STAs), and may include requests to join the restricted TWT session. In some implementations, the restricted TWT session component 1522 establishes and schedules one or more restricted TWT sessions on a wireless medium. The early TWT SP termination component 1524 determines whether there is an absence of data transmissions from STAs belonging to the restricted TWT session for more than a certain time period of a respective TWT SP. The latency sensitive traffic determination component 1526 determines whether traffic associated with a STA qualifies as latency sensitive traffic, for example, based on whether a TID of the STA's traffic flow matches one or more TIDs indicated in the TWT Element. The transmission component 1530 is configured to transmit TX signals to other wireless communication devices. In some implementations, the TX signals may include a beacon frames, CTS frames, CF-END frames, or trigger frames.

Implementation examples are described in the following numbered clauses:

1. A method for wireless communication performed by a wireless communication device operating as an access point (AP), including:

establishing a restricted target wake time (TWT) session on a wireless medium for one or more wireless stations (STAs) associated with latency sensitive traffic, the restricted TWT session including one or more restricted TWT service periods (SPs) for communications on the wireless medium with only the one or more STAs associated with the latency sensitive traffic;

transmitting a clear-to-send (CTS) frame on the wireless medium at a start of each restricted TWT SP of the one or more restricted TWT SPs, the CTS frame indicating to other STAs that the wireless medium is unavailable for a duration of the respective restricted TWT SP; and transmitting latency sensitive data to or receiving latency sensitive data from the one or more STAs during at least one restricted TWT SP of the one or more restricted TWT SPs.

2. The method of clause 1, where a receiver address (RA) of the CTS frame is set to a configured medium access control (MAC) address indicating that STAs belonging to the restricted TWT session are permitted to access the wireless medium during the respective restricted TWT SP.

3. The method of clause 2, where the configured MAC address corresponds to a configured network allocation vector (NAV) setting for the other STAs.

4. The method of any one or more of clauses 1-3, further including:

indicating that each of the other STAs is to terminate a transmit opportunity (TXOP) on the wireless medium at or before the start of each restricted TWT SP of the one or more restricted TWT SPs.

5. The method of any one or more of clauses 1-4, further including:
    indicating that each of the other STAs is not permitted to access the wireless medium during each restricted TWT SP of the one or more restricted TWT SPs.
6. The method of clause 4 or 5, where the indication is included in a TWT Parameter Information field of a TWT element carried in one or more beacon frames.
7. The method of any one or more of clauses 1-6, where the other STAs include non-latency sensitive STAs.
8. The method of any one or more of clauses 1-7, further including:
    permitting one or more of the other STAs to access the wireless medium during time periods outside the one or more restricted TWT SPs of the restricted TWT session.
9 The method of any one or more of clauses 1-8, further including:
    detecting an absence of data transmissions from the one or more STAs for more than a time period during a respective restricted TWT SP; and
    releasing control of the wireless medium during a remaining portion of the respective restricted TWT SP based on detecting the absence of data transmissions from the one or more STAs.
10. The method of clause 9, where releasing control of the wireless medium includes transmitting a contention-free end (CF-END) frame on the wireless medium.
11. The method of clause 9 or 10, further including:
    receiving uplink (UL) data from one or more of the other STAs during the remaining portion of the respective restricted TWT SP.
12. The method of any one or more of clauses 1-11, where establishing the restricted TWT session includes:
    transmitting a frame indicating a latency sensitive traffic priority associated with the restricted TWT session; and
    receiving, from each of the one or more STAs, a request to become a member of the restricted TWT session based on the indicated latency sensitive traffic priority.
13. The method of clause 12, where the indicated latency sensitive traffic priority corresponds to one or more selected traffic identifiers (TIDs).
14. The method of clause 13, where the one or more selected TIDs are associated with a voice access category (AC_VO).
15. The method of any one or more of clauses 13-14, where the one or more selected TIDs correspond to a configured label.
16. The method of any one or more of clauses 12-15, where the indicated latency sensitive traffic priority corresponds to a selected traffic flow.
17. The method of clause 16, where the selected traffic flow is identified by an IP 5-tuple or an IPv6 flow label.
18. The method of any one or more of clauses 12-17, further including:
    permitting the one or more STAs to transmit or receive only traffic corresponding to the one or more selected TIDs during each restricted TWT SP of the one or more restricted TWT SPs.
19. The method of any one or more of clauses 12-18, further including:
    verifying that each of the one or more STAs is associated with the indicated latency sensitive traffic priority; and
    joining the one or more STAs to the restricted TWT session based on their respective verifications.
20 The method of any one or more of clauses 12-19, where the frame includes one or more of a beacon frame, a probe response frame, an association frame, or a re-association frame.
21. The method of clause 12, where the frame includes one or more TWT parameters associated with the restricted TWT session.
22. The method of clause 21, where the one or more TWT parameters are included in a TWT Parameter Information field of a TWT element carried in one or more beacon frames.
23. The method of clause 21 or 22, where the one or more TWT parameters indicate whether the restricted TWT session is a peer-to-peer TWT session.
24. The method of clause 21, where the one or more TWT parameters indicate whether the restricted TWT session is full.
25. The method of any one or more of clauses 1-24, where establishing the restricted TWT session includes:
    determining a periodicity of latency sensitive traffic associated with at least one of the one or more STAs; and
    configuring a TWT interval based on the determined periodicity.
26. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to:
        establish a restricted target wake time (TWT) session on a wireless medium for one or more wireless stations (STAs) associated with latency sensitive traffic, the restricted TWT session including one or more restricted TWT service periods (SPs) for communications on the wireless medium with only the one or more STAs associated with the latency sensitive traffic;
        transmit a clear-to-send (CTS) frame on the wireless medium at a start of each restricted TWT SP of the one or more restricted TWT SPs, the CTS frame indicating to other STAs that the wireless medium is unavailable for a duration of the respective restricted TWT SP; and
        transmit latency sensitive data to or receive latency sensitive data from the one or more STAs during at least one restricted TWT SP of the one or more restricted TWT SPs.
27. The wireless communication device of clause 26, where a receiver address (RA) of the CTS frame is set to a configured medium access control (MAC) address indicating that STAs belonging to the restricted TWT session are permitted to access the wireless medium during the respective restricted TWT SP.
28. The wireless communication device of clause 27, where the configured MAC address corresponds to a configured network allocation vector (NAV) setting for the other STAs.
29. The wireless communication device of any one or more of clauses 26-28, where execution of the processor-readable code is further configured to:
    indicate that each of the other STAs is to terminate a transmit opportunity (TXOP) on the wireless medium at or before the start of each restricted TWT SP of the one or more restricted TWT SPs.

30. The wireless communication device of any one or more of clauses 26-29, where execution of the processor-readable code is further configured to:
   indicate that each of the other STAs is not permitted to access the wireless medium during each restricted TWT SP of the one or more restricted TWT SPs.

31. The wireless communication device of clause 29 or 30, where the indication is included in a TWT Parameter Information field of a TWT element carried in one or more beacon frames.

32. The wireless communication device of any one or more of clauses 26-31, where the other STAs include non-latency sensitive STAs.

33. The wireless communication device of any one or more of clauses 26-32, where execution of the processor-readable code is further configured to:
   permit one or more of the other STAs to access the wireless medium during time periods outside the one or more restricted TWT SPs of the restricted TWT session.

34. The wireless communication device of any one or more of clauses 26-33, where execution of the processor-readable code is further configured to:
   detect an absence of data transmissions from the one or more STAs for more than a time period during a respective restricted TWT SP; and
   release control of the wireless medium during a remaining portion of the respective restricted TWT SP based on detecting the absence of data transmissions from the one or more STAs.

35. The wireless communication device of clause 34, where releasing control of the wireless medium includes transmitting a contention-free end (CF-END) frame on the wireless medium.

36. The wireless communication device of clauses 34 or 35, where execution of the processor-readable code is further configured to:
   receive uplink (UL) data from one or more of the other STAs during the remaining portion of the respective restricted TWT SP.

37. The wireless communication device of any one or more of clauses 26-36, where establishing the restricted TWT session includes:
   transmitting a frame indicating a latency sensitive traffic priority associated with the restricted TWT session; and
   receiving, from each of the one or more STAs, a request to become a member of the restricted TWT session based on the indicated latency sensitive traffic priority.

38. The wireless communication device of clause 37, where the indicated latency sensitive traffic priority corresponds to one or more selected traffic identifiers (TIDs).

39. The wireless communication device of clause 38, where the one or more selected TIDs are associated with a voice access category (AC_VO).

40. The wireless communication device of clause 38 or 39, where the one or more selected TIDs correspond to a configured label.

41. The wireless communication device of clause 37, where the indicated latency sensitive traffic priority corresponds to a selected traffic flow.

42. The wireless communication device of clause 41, where the selected traffic flow is identified by an IP 5-tuple or an IPv6 flow label.

43. The wireless communication device of any one or more of clauses 38-42, where execution of the processor-readable code is further configured to:
   permit the one or more STAs to transmit or receive only traffic corresponding to the one or more selected TIDs during each restricted TWT SP of the one or more restricted TWT SPs.

44. The wireless communication device of any one or more of clauses 37-43, where execution of the processor-readable code is further configured to:
   verify that each of the one or more STAs is associated with the indicated latency sensitive traffic priority; and
   join the one or more STAs to the restricted TWT session based on their respective verifications.

45. The wireless communication device of any one or more of clauses 37-44, where the frame includes one or more of a beacon frame, a probe response frame, an association frame, or a re-association frame.

46. The wireless communication device of any one or more of clauses 37-45, where the frame includes one or more TWT parameters associated with the restricted TWT session.

47. The wireless communication device of clause 46, where the one or more TWT parameters are included in a TWT Parameter Information field of a TWT element carried in one or more beacon frames.

48. The wireless communication device of clauses 46 or 47, where the one or more TWT parameters indicate whether the restricted TWT session is a peer-to-peer TWT session.

49. The wireless communication device of any one or more of clauses 46-48, where the one or more TWT parameters indicate whether the restricted TWT session is full.

50. The wireless communication device of any one or more of clauses 26-49, where establishing the restricted TWT session includes:
   determining a periodicity of the latency sensitive traffic associated with at least one of the one or more STAs; and
   configuring a TWT interval based on the determined periodicity.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   transmitting, in association with establishing a restricted target wake time (TWT) session on a wireless medium for one or more wireless stations (STAs), a management frame including a TWT parameter set field that includes one or more TWT parameters associated with the restricted TWT session, the one or more TWT parameters indicating that the restricted TWT session includes one or more restricted TWT service periods (SPs) that are available for communications on the wireless medium with the one or more STAs and that are unavailable for communications on the wireless medium with other STAs, the one or more STAs associated with latency sensitive traffic and the other STAs associated with a non-latency sensitive traffic; and
   transmitting latency sensitive data to, or receiving latency sensitive data from, the one or more STAs during at least one restricted TWT SP of the one or more restricted TWT SPs, wherein, in accordance with the one or more TWT parameters, each of a set of STAs is to terminate a respective transmit opportunity on the wireless medium at or before a start of each restricted TWT SP of the one or more restricted TWT SPs.

2. The method of claim 1, further comprising:
   transmitting the latency sensitive data to, or receiving the latency sensitive data from, the one or more STAs during the at least one restricted TWT SP of the one or more restricted TWT SPs based on the latency sensitive data corresponding to a traffic identifier (TID) associated with the restricted TWT session.

3. The method of claim 1, further comprising:
   indicating, via the one or more TWT parameters included in the TWT parameter set field, whether the restricted TWT session is full.

4. The method of claim 1, further comprising:
   transmitting a clear-to-send (CTS) frame on the wireless medium at a start of each respective restricted TWT SP of the one or more restricted TWT SPs, the CTS frame indicating to the other STAs associated with the non-latency sensitive traffic that the wireless medium is unavailable for a duration of the respective restricted TWT SP.

5. The method of claim 4, wherein a receiver address (RA) of the CTS frame is set to a configured medium access control (MAC) address indicating that STAs belonging to the restricted TWT session are permitted to access the wireless medium during the respective restricted TWT SP.

6. The method of claim 5, wherein the configured MAC address corresponds to a configured network allocation vector (NAV) setting for the other STAs.

7. The method of claim 1, further comprising:
   indicating, via the one or more TWT parameters included in the TWT parameter set field, that each of the set of STAs is to terminate the respective transmit opportunity on the wireless medium at or before the start of each restricted TWT SP of the one or more restricted TWT SPs.

8. The method of claim 7, wherein the indication is included in a TWT element carried in the management frame.

9. The method of claim 1, wherein the management frame indicates a latency sensitive traffic priority associated with the restricted TWT session, the method further comprising:
   receiving one or more requests to become a member of the restricted TWT session based on the latency sensitive traffic priority.

10. The method of claim 9, wherein the latency sensitive traffic priority corresponds to one or more selected traffic identifiers (TIDs).

11. The method of claim 10, further comprising:
    permitting the one or more STAs to transmit or receive only traffic corresponding to the one or more selected TIDs during each restricted TWT SP of the one or more restricted TWT SPs.

12. The method of claim 9, wherein the indicated latency sensitive traffic priority corresponds to a selected traffic flow identified by an IP 5-tuple or an IPv6 flow label.

13. The method of claim 1, further comprising:
    detecting an absence of data transmissions from the one or more STAs for more than a time period during a respective restricted TWT SP; and
    releasing control of the wireless medium during a remaining portion of the respective restricted TWT SP based on detecting the absence of data transmissions from the one or more STAs.

14. The method of claim 13, wherein releasing control of the wireless medium includes transmitting a contention-free end (CF-END) frame on the wireless medium.

15. The method of claim 13, further comprising:
    receiving uplink data from one or more of the other STAs during the remaining portion of the respective restricted TWT SP.

16. The method of claim 1, further comprising:
    determining a periodicity of the latency sensitive traffic associated with at least one of the one or more STAs; and
    configuring a TWT interval based on the periodicity.

17. The method of claim 1, further comprising:
receiving a first frame including a TWT request field associated with the restricted TWT session; and
transmitting a second frame including a TWT setup command field.

18. The method of claim 1, wherein the management frame comprises one or more of a beacon frame, a probe response frame, an association frame, or a re-association frame.

19. The method of claim 1, wherein the TWT parameter set field is included in a TWT element of the management frame.

20. The method of claim 1, wherein the one or more TWT parameters indicate whether the restricted TWT session is a peer-to-peer TWT session.

21. A wireless communication device, comprising:
one or more memories storing processor-readable code; and
one or more processors communicatively coupled with the one or more memories and configured to, when executing the processor-readable code, cause the wireless communication device to:
transmit, in association with establishing a restricted target wake time (TWT) session on a wireless medium for one or more wireless stations (STAs), a management frame including a TWT parameter set field that includes one or more TWT parameters associated with the restricted TWT session, the one or more TWT parameters indicating that the restricted TWT session includes one or more restricted TWT service periods (SPs) that are available for communications on the wireless medium with the one or more STAs and that are unavailable for communications on the wireless medium with other STAs, the one or more STAs associated with latency sensitive traffic and the other STAs associated with a non-latency sensitive traffic; and
transmit latency sensitive data to, or receive latency sensitive data from, the one or more STAs during at least one restricted TWT SP of the one or more restricted TWT SPs, wherein, in accordance with the one or more TWT parameters, each of a set of STAs is to terminate a respective transmit opportunity on the wireless medium at or before a start of each restricted TWT SP of the one or more restricted TWT SPs.

22. The wireless communication device of claim 21, wherein the one or more processors are further configured to, when executing the processor-readable code, cause the wireless communication device to:
indicate, via the one or more TWT parameters included in the TWT parameter set field, whether the restricted TWT session is full.

23. The wireless communication device of claim 21, wherein the one or more processors are further configured to, when executing the processor-readable code, cause the wireless communication device to:
transmit a clear-to-send (CTS) frame on the wireless medium at a start of each respective restricted TWT SP of the one or more restricted TWT SPs, the CTS frame indicating to the other STAs associated with the non-latency sensitive traffic that the wireless medium is unavailable for a duration of the respective restricted TWT SP.

24. The wireless communication device of claim 21, wherein the one or more processors are further configured to, when executing the processor-readable code, cause the wireless communication device to:
indicate, via the one or more TWT parameters included in the TWT parameter set field, that each of the set of STAs is to terminate the respective transmit opportunity on the wireless medium at or before the start of each restricted TWT SP of the one or more restricted TWT SPs.

25. The wireless communication device of claim 24, wherein the indication is included in a TWT element carried in the management frame.

26. The wireless communication device of claim 21, wherein the management frame indicates a latency sensitive traffic priority associated with the restricted TWT session, and wherein the one or more processors are further configured to, when executing the processor-readable code, cause the wireless communication device to:
receive one or more requests to become a member of the restricted TWT session based on the latency sensitive traffic priority.

27. The wireless communication device of claim 26, wherein the latency sensitive traffic priority corresponds to one or more selected traffic identifiers (TIDs).

28. The wireless communication device of claim 27, wherein the one or more processors are further configured to, when executing the processor-readable code, cause the wireless communication device to:
permit the one or more STAs to transmit or receive only traffic corresponding to the one or more selected TIDs during each restricted TWT SP of the one or more restricted TWT SPs.

29. The wireless communication device of claim 21, wherein the one or more processors are further configured to, when executing the processor-readable code, cause the wireless communication device to:
detect an absence of data transmissions from the one or more STAs for more than a time period during a respective restricted TWT SP; and
release control of the wireless medium during a remaining portion of the respective restricted TWT SP based on detecting the absence of data transmissions from the one or more STAs.

30. A non-transitory computer-readable medium storing code for wireless communication by a wireless communication device, the code comprising instructions executable by one or more processors to:
transmit, in association with establishing a restricted target wake time (TWT) session on a wireless medium for one or more wireless stations (STAs), a management frame including a TWT parameter set field that includes one or more TWT parameters associated with the restricted TWT session, the one or more TWT parameters indicating that the restricted TWT session includes one or more restricted TWT service periods (SPs) that are available for communications on the wireless medium with the one or more STAs and that are unavailable for communications on the wireless medium with other STAs, the one or more STAs associated with latency sensitive traffic and the other STAs associated with a non-latency sensitive traffic; and
transmit latency sensitive data to, or receive latency sensitive data from, the one or more STAs during at least one restricted TWT SP of the one or more restricted TWT SPs, wherein, in accordance with the one or more TWT parameters, each of a set of STAs is to terminate a respective transmit opportunity on the wireless medium at or before a start of each restricted TWT SP of the one or more restricted TWT SPs.

* * * * *